July 29, 1969 R. L. MOFFETT 3,457,652
INSTRUMENT FOR DETERMINING SETTING OF A LENS BEVEL-EDGER
Filed March 29, 1967
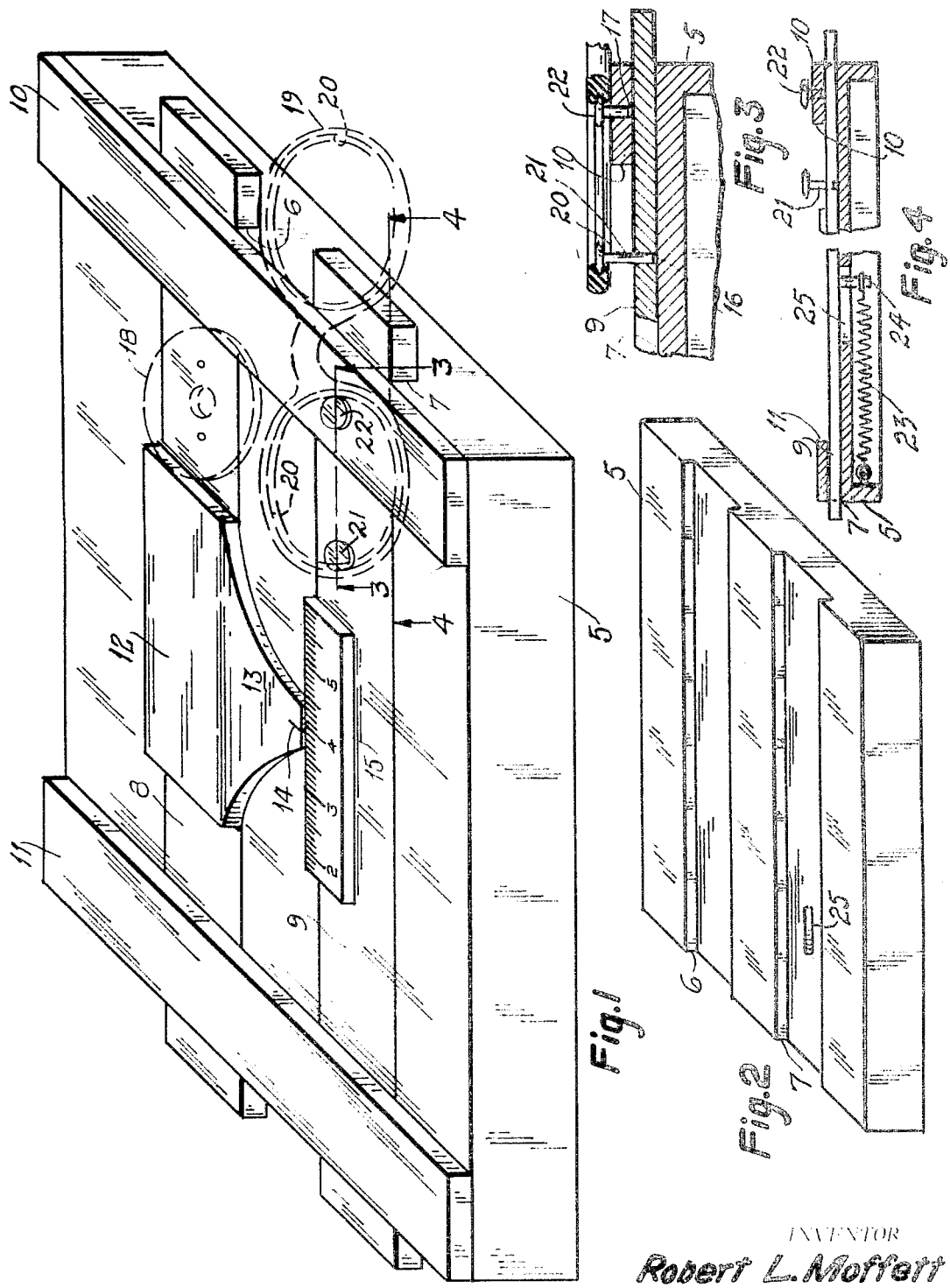
INVENTOR
Robert L. Moffett

United States Patent Office 3,457,652
Patented July 29, 1969

3,457,652
INSTRUMENT FOR DETERMINING SETTING OF A LENS BEVEL-EDGER
Robert L. Moffett, 7601 Moss Side Ave.,
Richmond, Va. 23227
Filed Mar. 29, 1967, Ser. No. 626,765
Int. Cl. A61b 3/10
U.S. Cl. 33—200                                    4 Claims

ABSTRACT OF THE DISCLOSURE

An instrument is disclosed for use in optical laboratories which will indicate the "set size," that is the setting in millimeters for the dial on a lens bevel-edger required for the edger to grind a lens of the shape and size to fit the opening in a spectacle frame in which the lens is to be mounted. The instrument automatically gauges the size of the opening as compared with the former or template employed on the edger to control the lens shape, and visually indicates the setting required for the edger, thus saving time and obviating the chance of error when the setting is mathematically calculated.

The present invention relates to equipment used in optical laboratories for determining the setting of a bevel edger so as to produce a lens of a size and shape to fit the opening in a spectacle frame in which the lens is to be placed the main objective of the invention being to automatically determine the so-called set size quickly and precisely rather than to rely on mathematical calculation which takes time and is subject to human error.

Another object of the present invention is to provide an instrument of the character and for the purpose above set forth which is of simple and durable construction, inexpensive to manufacture, of few parts and easy to operate.

Another object of the present invention is to provide an instrument having a scale from which the set size, automatically arrived at, will be visibly indicated.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

FIGURE 1 is a perspective view of the invention, the former, later to be described, and the spectacle frame for which lenses being to be ground by a bevel edger, are indicated in phantom lines;

FIGURE 2 is a detail shown in perspective of the base member of the instrument;

FIGURE 3 is a fragmentary sectional view taken on line 3—3 of FIGURE 1 looking in the direction of the arrows; and FIGURE 4 is a fragmentary sectional view taken along line 4—4 of FIGURE 1 looking in the direction of the arrows.

In the drawing like numerals refer to similar parts throughout the several views.

At 5 there is shown a rectangular metal base member having two spaced longitudinally extending milled channels 6 and 7. Longitudinally adjustable in the upper channel 6 is a slide bar 8; and similarly slidable in the lower channel 7 is a slide bar 9, the top surfaces of these bars being flush with that of the base 5. Integral with the base 5, as a means for retaining the slides 8 and 9 in their respective channels, are right and left elongated transversely extending strap members 10 and 11, respectively.

And, integrally formed with the top slide 8, on its upper surface, and centrally disposed with respect to the end straps, is a stop plate 12, which is curved along its lower edge to form an indexing finger portion 13 on which is an index marking 14. This marking cooperating with a millimeter scale 15 integral with the bottom slide 9 and coincident with the upper edge of finger portion 13. Preferably the ends of the two slides project slightly beyond the respective end edges of the base 5.

Extending vertically through the slide 9 is a hole 16 while a hole 17 is drilled through the strap member 10 only. These two holes contain the shanks of headed pins 21 and 22, respectively, for a purpose later to be explained.

The present method now generally employed in arriving at the set size in millimeters at which the dial on the bevel edger is to be set is: First measure in millimeters the major axis of the former, that is, the pattern to be followed by the edger. From this measurement which, for example is 40 mm., 36.5 mm. is subtracted, leaving a difference of 3.5 mm., which is then subtracted from the major axis of the opening in a frame into which a lens is to be fitted. Should this latter measurement be, again for example, 48 mm., the figure arrived at 44.5 mm., will be the set size. These measurements and mathematical computations are often erroneous. In the present device the instrumentalities thereof are so set manually, no measurements being required, that the reading on scale 15 will give a visual indication of the set size for which the dial on the bevel edger is to be set. The operation is quick, accurate and a time saver.

In operating the instrument of the present invention, the lens former disc, indicated in phantom lines at 18 in FIGURE 1, is removably located on the upper slide 8 so that, when the slide is manually moved to the right, the former 18 will be clamped between the opposing side faces of the index plate 12 and the strap 10, the contacting points of the members 12 and 10 with the former disc 18 being at the ends of its major axis.

The spectacle frame 19, also indicated in phantom lines, rests, as shown, upon, and transversely of, the strap 10, with the major axis of the one grooved lens opening 20 in the frame in line with the pin openings 16 and 17.

At this time the heads of pins 21 and 22 had been inserted in the holes 16 and 17, respectively, the heads of such pins being formed to engage in the frame slot 20. Slide 9 is manually movable to the right but is spring retractable, thus bringing the pins 21 and 22 relatively toward each other with their heads entered in the groove 20 at diametrally opposite sides thereof. The slide retraction means is a coiled spring 23 anchored at one end to the base 5 and at its other end to a stud 24 depending from the slide 9 through an elongated slot 25 in the bottom wall of base channel 7. Spring 23 draws slide 9 resiliently toward the left in FIG. 1, moving scale 15 relative to marking 14 on plate 12. From the foregoing it will readily be observed that with this relative movement of the slides 8 and 9, and of the index mark 14 along the edge of scale 15, a precise set size for the edger dial will be visibly indicated. It may be added that, while the edger makes a lens of the size and shape to fit the slot opening 20 in the spectacle frame, the finished lens will be the same shape as the lens former but not necessarily the same size.

What I claim is:

1. An optical instrument for determining what the setsize reading has to be on the dial of a bevel edger to produce a lens to fit a lens opening in a spectacle frame, comprising a base having a projection thereon, two members mounted on said base for parallel sliding movement thereon, one of said slidable members being slidably positionable on said base by a former, that has the shape to be followed by the bevel edger and that is disposed between one end of said member and said projection, means on said base for supporting a spectacle frame having an opening therein in which a lens is to be mounted, means carried by said base to engage in said opening at one side of said opening, means carried by the other slidable member to engage in said opening at the diametrally opposite side of said opening, means for automatically effecting sliding movement of said other slidable member on said base to an extent limited by the two means engaging in said opening, and cooperating measuring means on adjoining surfaces of said two slidable members to indicate their sliding movements relative to one another, thereby to indicate the set-size reading of the bevel edger required to produce a lens to fit the lens opening.

2. In an optical instrument for determining what the set-size reading is to be on the dial of a bevel edger operating to produce a lens to fit a spectacle frame opening, a base, a former disc providing a pattern to be followed by the bevel edger, an index slidably adjustable on said base to measure the major axis of said former disc, means also adjustable on said base for supporting a spectacle frame having a lens opening therein, said supporting means automatically measuring the major axis of said lens opening, and a scale in cooperation with said index and movable with said spectacle supporting and measuring means, the set-size to be determined being visibly indexed on said scale by the relative adjustments of said index and the said scale, said base being a rectangular block having two parallel longitudinally extending open ended channels therein and including an upper slide and a lower slide each guided for longitudinal movement in a respective one of said channels, right and left transversely extending strap members integral with the top surface of said base and aligned, respectively, with respective side faces of the base, said strap members providing limiting stops for the movement of said slides and means for retaining said slides in their respective channels, said index being a projecting portion of a plate integral with the top face of the upper one of said slides, and said scale being divisional markings on a further plate integral with the top face of the lower one of said slides, said former disc being removably mounted on said upper slide, and said spectacle supporting and measuring means comprising two upstanding pins, one in said right hand strap member and the other in said lower slide.

3. An optical instrument according to claim 2, wherein said pins are headed to engage in the slot surrounding the lens opening in the supported spectacle frame and so spaced apart as to contact the ends of the major axis of the said lens opening.

4. An optical instrument according to claim 2, wherein said upper slide is manually operable so as to clamp said former disc with one end of its major axis in contact with said right hand strap and its other end in contact with a side face of the said index plate, the said lower slide being manually movable in one direction and spring retractable in the opposite direction.

References Cited
UNITED STATES PATENTS

| | | |
|---|---|---|
| 803,794 | 11/1905 | Starbuck. |
| 933,992 | 9/1909 | Ketchum. |
| 2,088,914 | 8/1937 | Long. |
| 2,796,658 | 6/1957 | Aller. |
| 3,050,860 | 8/1962 | Kosh. |
| 3,315,369 | 4/1967 | Johnson _____ 33—200 |

WILLIAM D. MARTIN, Jr., Primary Examiner

U.S. Cl. X.R.

33—143, 174